(12) United States Patent
Chen et al.

(10) Patent No.: US 7,306,332 B2
(45) Date of Patent: Dec. 11, 2007

(54) EYEWEAR TEMPLE ASSEMBLY

(76) Inventors: Chien Pong Chen, 17 Alexandria Dr., East Hanover, NJ (US) 07936; Huang Ting Chen, 17 Alexandria Dr., East Hanover, NJ (US) 07936

( * ) Notice: Subject to any disclaimer, the term of this patent is extended or adjusted under 35 U.S.C. 154(b) by 0 days.

(21) Appl. No.: 11/272,648

(22) Filed: Nov. 14, 2005

(65) Prior Publication Data

US 2007/0046890 A1 Mar. 1, 2007

Related U.S. Application Data

(60) Provisional application No. 60/712,583, filed on Aug. 30, 2005.

(51) Int. Cl.
*G02C 11/08* (2006.01)

(52) U.S. Cl. .................. 351/62; 351/121; 351/158

(58) Field of Classification Search .............. 351/41, 351/111, 119, 121, 158, 62
See application file for complete search history.

(56) References Cited

U.S. PATENT DOCUMENTS

| | | | |
|---|---|---|---|
| 4,382,446 A | 5/1983 | Truelock et al. | |
| 4,806,008 A | 2/1989 | Tarloff | |
| 5,321,442 A | 6/1994 | Albanese | |
| 5,455,638 A * | 10/1995 | Kallman et al. | 351/44 |
| 5,539,480 A | 7/1996 | Rakoff et al. | |
| 5,636,787 A | 6/1997 | Gowhari | |
| 5,953,834 A | 9/1999 | Clodic | |
| 6,036,309 A * | 3/2000 | Liu et al. | 351/111 |
| 6,305,798 B1 | 10/2001 | Whisenant | |
| 6,929,365 B2 | 8/2005 | Swab et al. | |

* cited by examiner

*Primary Examiner*—Huy Mai

(57) ABSTRACT

Here we present an eyewear temple assembly that provides the flexibility to add thermal regulation to eyewear in an integrated and concealed manner. Our eyewear temple assembly is comprised of a temple tip, temple, cartridge compartment(s), detachable cover(s), and removable cartridge(s). The presented eyewear temple assembly also 1) accommodates, secures, and conceals said cartridge(s), 2) exchanges heat between said cartridge(s) and the wearer and/or environment, and 3) modulates the rate of thermal exchange between said cartridge(s) and the user or environment.

4 Claims, 4 Drawing Sheets

EYEWEAR TEMPLE ASSEMBLY

CROSS-REFERENCE TO RELATED APPLICATIONS

The present application relates to and claims priority with regard to all common subject matter of the provisional patent application titled "Eyewear temple assembly," Ser. No. 60/712,583, filed Aug. 30, 2005. The identified provisional patent application is hereby incorporated into the present application by reference.

FIELD OF THE INVENTION

In one aspect, the present invention relates to eyewear with temple assemblies that contain storage recesses and detachable temples, temple tips, or other temple attachments. In another aspect, the present invention is related to eyewear with temple components that provide additional functions. In yet another aspect, the present invention relates to prior works of art that provide thermal regulation of the head.

BACKGROUND OF THE INVENTION

Current eyewear serves to correct vision or to provide protection for the eyes, such as against UV radiation or physical injuries. However, as demonstrated by sunglasses that provide music playing and cell phone capabilities, consumer interest is growing in augmented eyewear, which offers functionalities that go beyond the obvious features. One way to accomplish this is for eyewear to incorporate detachable parts and concealable compartments, which can store or hold additional functional components. For convenience, eyewear parts should be easily disassembled and reassembled. Therefore, the integration of temple assemblies containing cartridge compartment(s) and installable functional cartridge(s) would allow for convenient modification and enhancement of existing eyewear capabilities without sacrificing style.

Although related prior works of art exist, these inventions have not met all of the needs mentioned above and, instead, have incorporated numerous significant shortcomings. For example, with respect to temples containing compartments or that also can be disassembled and reassembled, U.S. Pat. No. 6,305,798 describes the integration of a hinge repair kit, consisting of loose parts like screws, within a temple compartment. U.S. Pat. No. 5,321,442 presents sunglasses consisting of a base eyewear assembly with detachable components. With respect to the temples, snap-on attachments allow a user to add differently styled temple sidebars. U.S. Pat. No. 4,806,008 presents eyeglasses with temples having small recess area(s) containing identification tag(s). Transparent window(s) allow the tag(s) to be visible while acting as lid(s) to keep the tag(s) within the recess area(s). Thus, the inventions suggested heretofore typically include temples 1) containing components that are not fully secured in compartments, 2) having obtrusive temple attachments, or 3) incorporating transparent compartment covers that do not fully conceal the contents of the recessed area(s).

In regards to the integration of additional eyewear functionalities, U.S. Pat. No. 5,539,480 presents sunglasses that incorporate an unwieldy sunscreen dispenser. Eyewear with integrated electronic components have also been described recently. U.S. Pat. No. 6,929,365 describes a Bluetooth component being integrally embedded into the temple whereas U.S. Pat. No. 5,455,638 describes a micro-electronics power and control system for battery-powered, electrochromic eyewear. However, if any electronic component malfunctions, then the user will have to replace a significant portion of the eyewear, such as a whole temple, rather than the individual defective component. In addition, aromatic dispensing applications have been described. U.S. Pat. No. 5,636,787 presents an aromatic dispensing device attached to a pair of eyeglasses. Similarly, U.S. simply dispense but are difficult to adjust the amount or the rate of aromatics being released. Therefore, the inventions suggested heretofore typically include eyewear assemblies that 1) are unwieldy and potentially messy because of an accident, 2) are costly to own due to the requirement of replacing an entire temple, or 3) lack the ability to regulate the interaction between the functional module and the user or environment.

Furthermore, a particular function that is not being addressed in current eyewear relates to the field of thermal regulation. Many eyewear users, like athletes or construction workers, live and work in harsh thermal conditions, such as summers and winters in the Southwest. For example, heat exhaustion, which includes important symptoms such as dizziness, nausea, and headaches, often occurs above an internal body temperature of 40° C. (104° F.). Any body temperature above 41° C. becomes a critical condition that will lead to heat stroke, which can cause disorientation, convulsions, and unconsciousness. Such heat conditions highlight the thermal sensitivity of the brain; consequently, regulating head temperature is important. An elegant solution would be to have protective eyewear with additional thermal regulation capabilities.

Others have tried to regulate head temperature. U.S. Pat. No. 5,953,834 describes the incorporation of "heat pipes" into a bonnet that is worn on the head. However, this invention does not cover eyewear. U.S. Pat. No. 4,382,446 presents an unwieldy heat transfer device for regulating the temperature of the scalp. Thus, the inventions suggested heretofore typically include thermal regulating systems that 1) are not integrated into convenient, stylish eyewear or 2) are cumbersome for the user to wear.

BRIEF SUMMARY OF INVENTION

To the best of our knowledge, we are not aware of any eyewear invention that provides the flexibility to add functionalities, such as thermal regulation for the user's head, in an integrated and concealed manner. Our invention will satisfy the identified needs described above and alleviate the problems that have been discussed previously in a convenient yet stylish fashion. Specifically, the invention being presented is an eyewear temple assembly comprised of exchangeable cartridges, which can provide thermal regulation of a user's head, while being secured within concealed compartments.

Typically, an eyewear assembly is comprised of a frame, lenses, bridge, nose-pads, and temple assemblies. Our temple assembly invention is comprised of a temple, removable cartridge, cartridge compartment that can accommodate and conceal one or multiple said cartridge(s), and temple tip attached to a temple in a permanent or detachable manner. The removable cartridge comprises of materials and components, including electronic or non-electronic or any combination thereof, which will provide functions such as thermal regulation. The cartridge compartment can be within the temple, within the temple tip, or be comprised of sub-compartments within the temple and temple tip. In the case of temple assemblies with sub-compartments, the two sub-compartments (one in the temple and another in the temple tip) will form a single cartridge compartment when a detachable temple tip is attached to a temple. Moreover, the temple assembly is comprised of various means to 1) secure & conceal cartridge(s) within the cartridge compartment, 2) allow said cartridge(s) to interact with the user or the environment, and 3) modulate the rate of interaction, such as thermal exchange, between said cartridge(s) and the environment.

As illustrative examples, we present two preferred embodiments of our temple assembly invention whereby thermal regulation capabilities are added to a pair of eyeglasses. In one preferred embodiment (embodiment 1), the mechanism for securing and concealing thermal regulating cartridge(s) comprises of a system employing a temple lid that encloses the cartridge compartment on the exterior lateral surface of the temple assembly and cartridge restraints that secure the cartridge within the cartridge compartment. The compartment lid has tabs that insert into matching slots in the cartridge compartment. The lid will form at least a part of the exterior lateral surface of the temple. Opening(s) on the interior lateral surface of the temple assembly will allow the cartridge to interact with the eyewear user's head and the surrounding environment. Lastly, installable cover(s) having variable sized holes can fit into or over the interior lateral surface opening(s) to modulate the rate of interaction, such as cooling or heating, between said cartridge(s) and the eyewear user's head.

In another preferred embodiment (embodiment 2), our temple assembly invention comprises of a cartridge compartment comprised of two sub-compartments (one in the temple and the other in the temple tip) that can accommodate one or more thermal regulating cartridge(s). To secure and conceal said cartridge(s) within the compartment, each detachable temple tip will act as a cap to enclose the opening at the end of each temple. Meanwhile, tabs on said cartridge(s) and accompanying slots in the cartridge compartment will also secure said cartridge(s). Embodiment 2 also is comprised of opening(s) on the interior lateral surface of the temple assembly, similar to embodiment 1, that provide a means of interaction between said cartridge(s) and the user's head. Furthermore, embodiment 2 can utilize similar covers used by embodiment 1 to vary the rate of interaction, such as cooling or heating, between said cartridge(s) and the eyewear user's head.

In one aspect, the present invention provides modifiable temple assemblies that specifically have the ability to securely accommodate and conceal removable cartridge(s) within hidden compartment(s). For example, an embodiment of the present invention incorporates a means, such as cartridge restraints and a detachable temple lid, to secure a self-contained cartridge in a compartment. The temple parts come together in a fashion as to render any installable component unobtrusive and hidden, thereby preserving the style of the temples as well as the eyewear assembly.

In another aspect, the present invention offers a means to quickly, cost effectively, and conveniently add functionalities to eyewear via the application of modular, functional cartridge(s) that fit into properly sized compartments. For instance, rather than replacing an entire temple, a user can just remove the old cartridge and install a new one.

In yet another aspect, the present invention provides an eyewear temple assembly that can regulate the thermal state of an eyewear user's head. The temple assembly is comprised of a removable, reusable thermal regulating cartridge that is unobtrusively contained within a hidden compartment. Lateral surface opening(s) on the temple assembly will provide a means for the thermal regulating cartridge to interact with the wearer of the eyeglasses as well as the environment. This invention offers an eyewear user with a convenient, stylish, and effective method to protect his eyes while potentially preventing heat-associated health conditions.

Our temple assembly invention is distinct from prior works of art because of the ability to add functionalities, such as thermal regulation, to eyewear by fully securing and concealing, within hidden compartments, modular & replaceable cartridge(s) that is comprised of all necessary capabilities and materials. Our invention also incorporates the parts of the temple assembly in such manner(s) as to have the functional cartridge and any detachable part(s) be seamlessly integrated within the temple assembly in order to preserve the eyewear's style and form. Other related previous works in eyewear often use simple attachment(s) for the temple so that the attached component(s) are visible and can alter the look or style of the eyewear. Alternatively, prior works in eyewear that use cartridges don't fully conceal the cartridge or its corresponding compartment(s).

Furthermore, our invention allows the addition of diverse functions to eyewear through the installment of cartridge(s) comprised of different, unique capabilities. Each of the previous eyewear inventions is limited to a single, constant functionality. In addition, unlike other prior inventions that provide new functions, our invention incorporates various means of modulating the rate of interaction between the functional component and the user or environment. Moreover, our temple assembly is novel in that no prior invention offers thermal regulation in the form of cartridge(s) installed within eyewear. Finally, various other objects, advantages, and features of the invention will become apparent to those skilled in the art from the following discussion, taken in conjunction with the accompanying drawings.

DETAILED DESCRIPTION OF THE INVENTION

The present invention will now be described more fully hereinafter with reference to the accompanying drawings, in which two embodiments of the invention are shown. This invention may, however, be embodied in many other different forms and should not be construed as being limited to the embodiments set forth herein; rather, these embodiments are provided so that this description will be clear and thorough as well as convey the scope of the invention to those skilled in the art.

Figure 1:
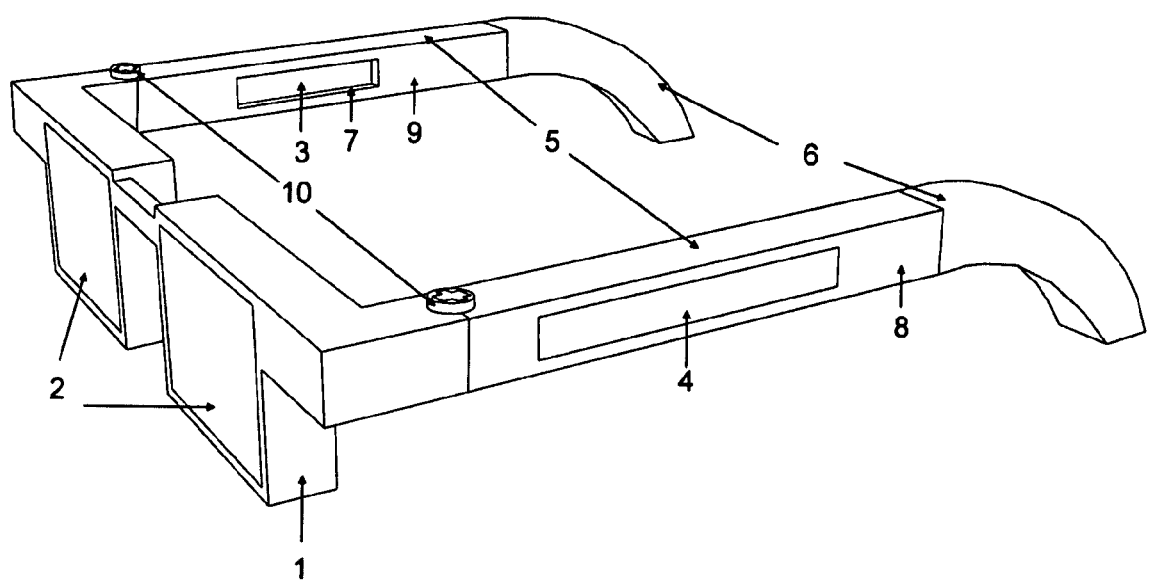
FIG. 1 provides a perspective view of an embodiment 1 of our temple assembly invention, in the context of a pair of eyeglasses, with all component parts installed and incorporated unobtrusively.
Figure 2:
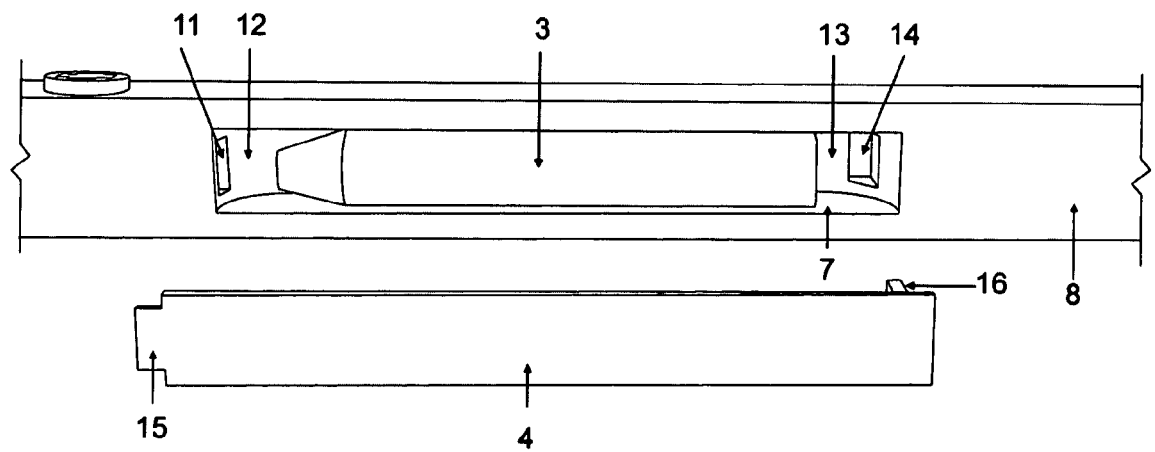
FIG. 2 provides a side view of the temple assembly components of an embodiment 1. The orientation of the figure is such that the viewer is looking at the external lateral surface of a temple assembly.
Figure 3:
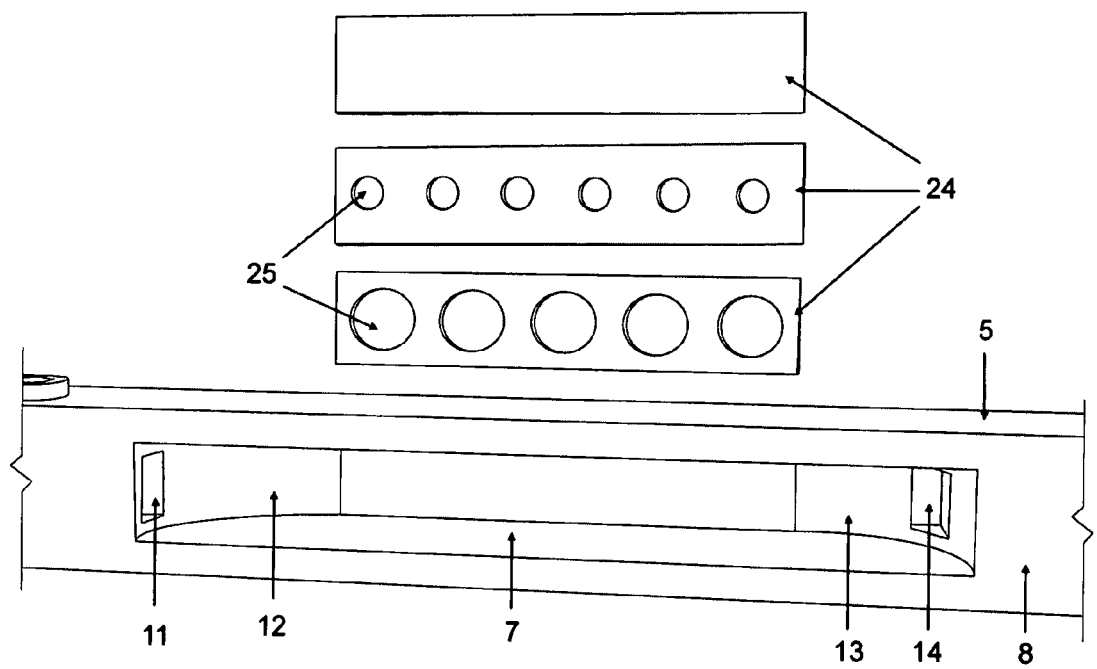
FIG. 3 provides a side view of the temple, the cartridge compartment, cartridge restraints, and tab slots of an embodiment 1 without the compartment lid. Also shown are three variations of installable covers; each can be used to modulate the rate of cooling or heating by a thermal regulating cartridge. The covers can fit into or over the interior lateral surface opening(s).

An embodiment 1 of the present invention is shown in the context of a pair of eyeglasses, as depicted in FIGS. 1, 2, and 3. FIG. 1 displays a perspective view of an eyewear assembly with two temple assemblies (embodiment 1) and all temple assembly parts installed and secured. The eyewear assembly is comprised of two temple assemblies and a pair of eyeglasses, which has a frame 1, two lenses 2, a bridge, and nose-pads. Frame 1 can be attached to temples 5 in any of the current standard means of making an eyewear assembly, which is depicted here as temple hinge screws 10. Each temple assembly is comprised of a temple 5, temple tip 6, a cartridge compartment 7, an installable cartridge 3, and a mechanism to secure the installable cartridge to the cartridge compartment.

For embodiment 1, installable cartridge 3 is a thermal regulating module that fits into compartment 7. Compartment lid 4, when installed, will help secure and conceal thermal regulating cartridge 3 within cartridge compartment 7. In embodiment 1, compartment lid 4 represents one possible way of securing thermal regulating cartridge 3 in compartment 7. It will be understood by those skilled in the art that embodiment 1 of the presented invention can be readily manufactured, changed, modified, and/or adapted in numerous ways to accommodate an unlimited range of uses.

FIG. 2 shows cartridge compartment 7 in more detail, from the perspective of exterior lateral surface 8 of a temple assembly. Compartment 7 is depicted as a hollow region (better seen in FIG. 3) that extends through the full thickness of the temple from the exterior to the interior lateral surface. The temple's interior lateral surface 9 (seen in FIG. 1) is adjacent to the head of an eyewear user. The compartment should be large enough to accommodate any cartridge, such as a thermal regulating cartridge. However, the compartment can also be larger than a cartridge and can extend the full length of the temple as to accommodate multiple cartridges. Cartridge compartment 7 can also 1) be of any shape, 2) involve any end(s) or surface(s) of a temple, and 3) protrude out from or extend into any surface of a temple, For example, compartment 7 is not limited to the dimensions of the temple but can also bulge out from exterior lateral temple surface 8.

As displayed in FIG. 2, an installable, self-contained cartridge 3 can be of any size and shape as long as it is securely placed into cartridge compartment 7. Cartridge 3 is comprised of materials and components, including electronic or non-electronic or any combination thereof, which will provide useful functions. For instance, cartridge 3 can be a simple, miniature, thermal regulating cartridge that an eyewear user utilizes to regulate his/her head temperature in a convenient and unobtrusive manner. However, a cartridge is not limited to just this functionality but can also include any other function(s) that are only restricted by the component(s) & material(s) in the cartridge as well as the physical dimensions of the compartment & the cartridge.

In order to secure and conceal a thermal regulating cartridge 3 within compartment 7, compartment lid 4 (as seen in FIG. 2) and cartridge restraints 12 and 13 (as can be seen more clearly in FIG. 3) within compartment 7 are incorporated into the temple assembly. Compartment lid 4 can be fitted onto the temple such that tabs 15 and 16 on compartment lid 4 will fit into tab slots 11 and 14 in compartment 7, as shown in FIG. 2. Cartridge restraints 12 and 13 make the compartment opening on the interior lateral surface slightly smaller than the size of a cartridge and prevent the cartridge from falling out from the interior lateral surface.

Installing a miniature thermal regulating cartridge 3 into cartridge compartment 7, in a secure and concealed manner, is easy and convenient, as depicted in FIG. 2. A user starts by removing compartment lid 4 from the temple assembly. Specifically, the wearer lifts the end of compartment lid 4 nearest the temple tip in a direction perpendicular to the plane of exterior lateral surface 8 of the temple. This end of compartment lid 4 is next to tab 16, which originally fitted into tab slot 14. Once this end is detached from the temple, the user then pulls compartment lid 4 in a direction roughly parallel to the plane of exterior lateral surface 8 and towards the temple tip. Such a motion will release tab 15 from tab slot 11 and will free compartment lid 4 from the temple, thus exposing cartridge compartment 7.

In a temple assembly where no cartridge has been installed, a user will see an empty compartment 7, as depicted in FIG. 3. Once the empty cartridge compartment 7 is revealed, the user simply places a cartridge into cartridge compartment 7, as shown in FIG. 2. Thermal regulating cartridge 3 should fit snugly into compartment 7. Cartridge restraints 12 and 13 hold the cartridge in place so that the cartridge does not fall out of the interior lateral surface opening.

Once the cartridge is placed into cartridge compartment 7, the user simply has to fit compartment lid 4 back into place. Tabs slots 11 and 14 in compartment 7 will accept tabs 15 and 16 from compartment lid 4. The user first aligns compartment lid 4 parallel to the temple, as depicted in FIG. 2. The user then positions tab 15 into tab slot 11, which will secure the end of the lid closest to the frame. The user then pushes compartment lid 4 towards the temple, whereby tab 16 will be inserted into tab slot 14 and thus secure the end of compartment lid 4 closest to the temple tip. These steps complete the description of a thermal regulating cartridge's secure installation into a temple assembly.

Of note, the presented system of cartridge restraints and compartment lids is but one possible embodiment of securing and concealing a cartridge in a compartment. Moreover, the presented mechanism to secure and conceal a cartridge in a compartment can be embodied in many other different forms and should not be construed as being limited to this embodiment. The temple assembly described in embodiment 1 thus unobtrusively adds useful functional capabilities without sacrificing form and style.

Once a cartridge is installed and securely concealed, one can see an opening of cartridge compartment 7 along interior lateral surface 9 (as shown in FIG. 1). The opening(s) allow cartridge 3, such as a thermal regulating cartridge, to be physically and visually accessible. It is through such opening(s) that a user's head can interact with cartridge 3. A user may also wish to modulate the rate of interaction, such as cooling or heating. A means to accomplish this is through a system of modular and detachable cover(s) 24 that fit into or over the interior lateral surface opening(s), as shown in FIG. 3. Cover(s) 24 can be made of thermal insulating material. Rubber linings around the edges of the cover(s) or any other appropriate methods & mechanisms will secure the covers to the interior lateral surface openings. In FIG. 3, we show one possible implementation of cover(s) whereby variable sized hole(s) 25 are used to control the amount of heating or cooling. Larger holes will permit the thermal regulating cartridge to cool or heat the user or the environment at a faster rate. Alternatively, if a user wants to temporarily block all thermal regulation functionalities, a cover with no holes can be installed.

Figure 3A:
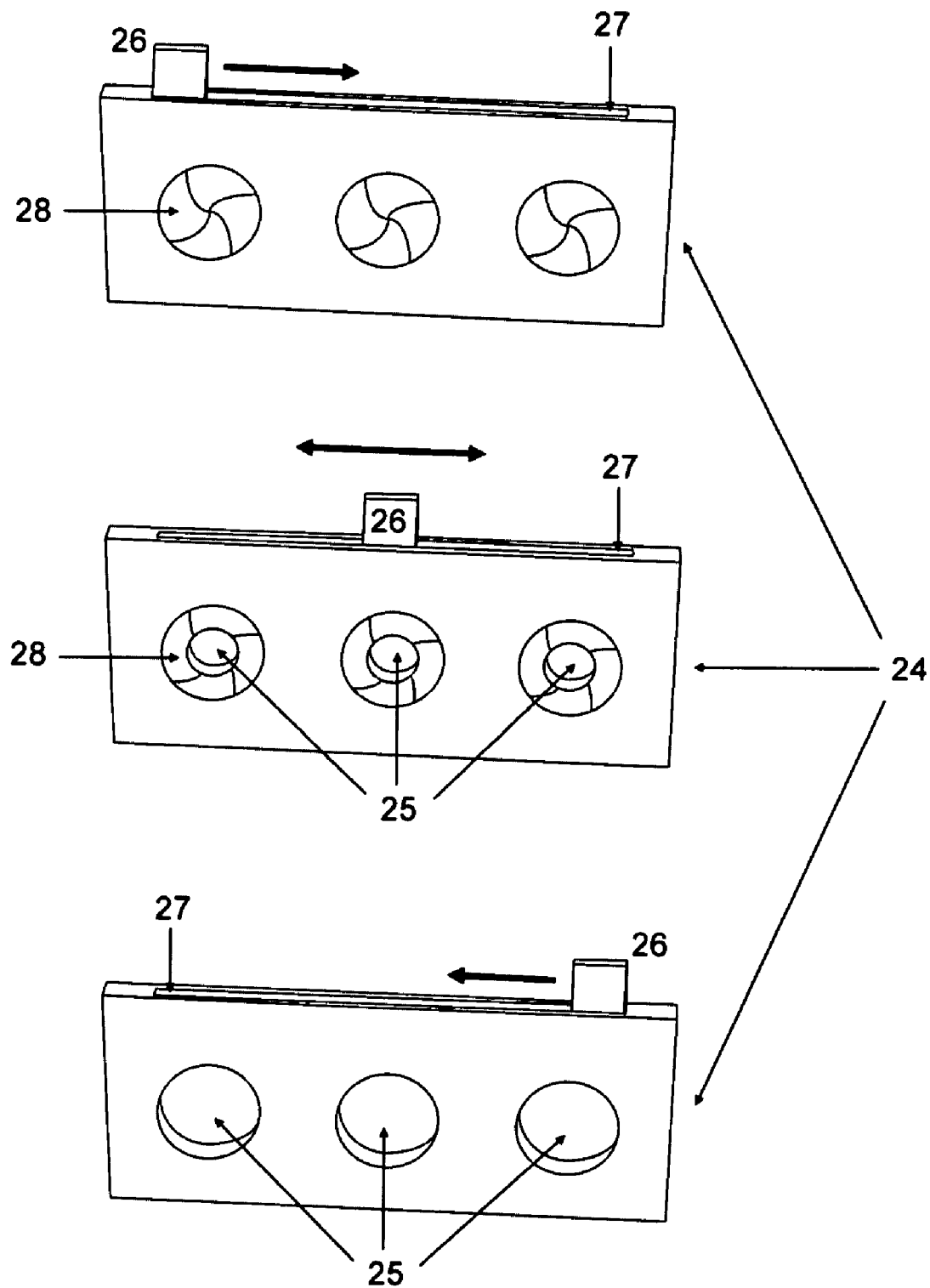
FIG. 3A provides a perspective view of the eyewear temple assembly's detachable and installable cover, which has user-adjustable apertures. Displayed are three different aperture settings of the same cover.

In FIG. 3A, a detachable cover 24 in three different settings for the diaphragms 28 and apertures 25 is shown. Starting at the top of FIG. 3A, the detachable cover 24 and cover tab 26 are in the closed setting. The diaphragms 28 are fully shut without any apertures. In the cover setting displayed in the top of FIG. 3A, heat exchange is minimized between an user and a thermal regulating cartridge. However, by sliding cover tab 26 tab groove 27 and in the direction shown in the top of FIG. 3A, an user can start to open up the diaphragms 28. the opening of the diaphragms 28 will create apertures that will allow heat exchange between the user and a cartridge. In the middle of FIG. 3A, the detachable cover 24 and cover tab 26 are in the semi-opening setting. Diaphragms 28 have been partially opened and apertures 25 are presented. Heat exchange between a thermal regulating cartridge and an user can now occur. Moreover, cover tab 26 can slide back and forth in the tab groove 27 and in the directions shown in the middle of FIG. 3A so that the apertures 25 can become bigger or smaller. In the bottom of FIG. 3A, we show the detachable cover 24 and cover tab 26 in the fully open setting. Apertures 25 are at their widest and the maximum heat exchange between an user and a thermal regulating cartridge is available. If the user wants to reduce heat exchange between himself and a cartridge, he needs to slide the cover tab 26 in the direction shown at the bottom of FIG. 3A so that apertures 25 will become smaller.

Other variations of the thermal regulating cover(s) 24 need not have holes to control the rate or amount of interaction between the user and the cartridge. With respect to thermal regulation, the cover(s) can be solid and, instead of using variable sized holes, can be composed of different materials that possess varying insulating capacities. Of note, the presented method, which consists of regulating cover(s) fitting into or over the interior lateral surface opening(s), is but one possible means to modulate the rate or amount of interaction, such as thermal regulation, between the cartridge and the user. Moreover, the presented mechanism to modulate the rate or amount of interaction between the cartridge and the user can be embodied in many other different forms and should not be construed as being limited to this embodiment.

Figure 4:
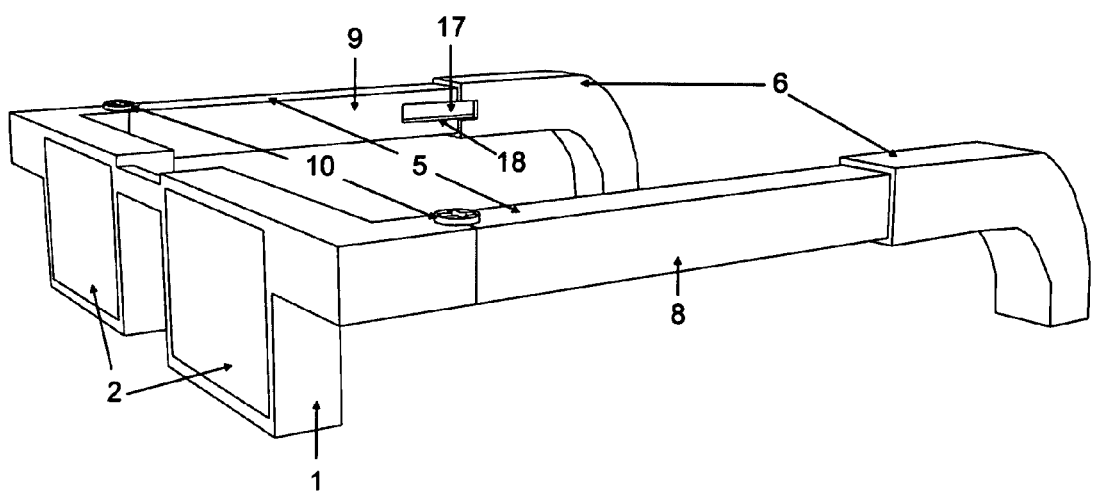
FIG. 4 provides a perspective view of an embodiment 2 of our temple assembly invention, in the context of a pair of eyeglasses, with all component parts installed and incorporated unobtrusively.
Figure 5:
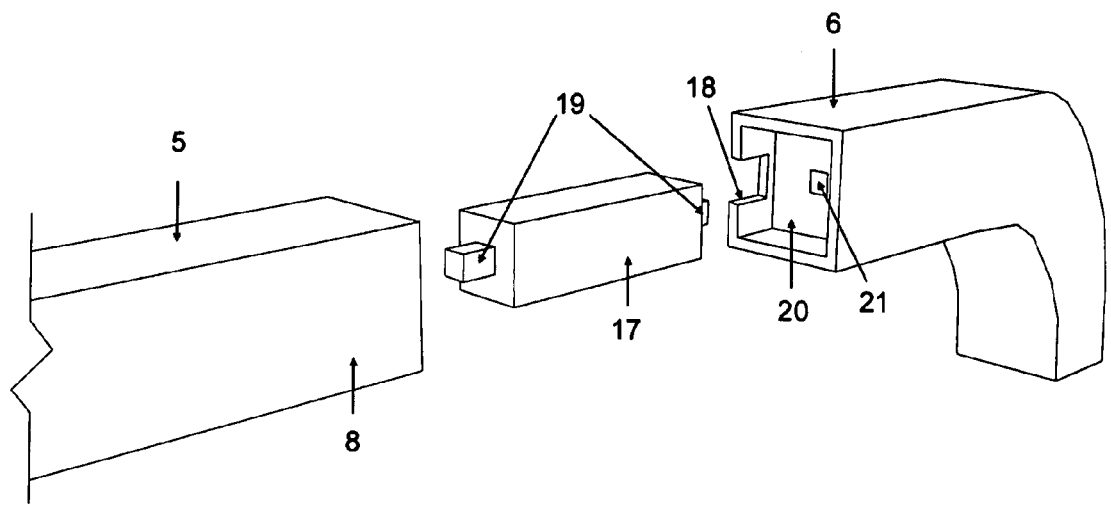
FIG. 5 provides a perspective view of an embodiment 2 whereby the components of the temple assembly are shown. This view clearly displays the cartridge sub-compartment in the temple tip.
Figure 6:
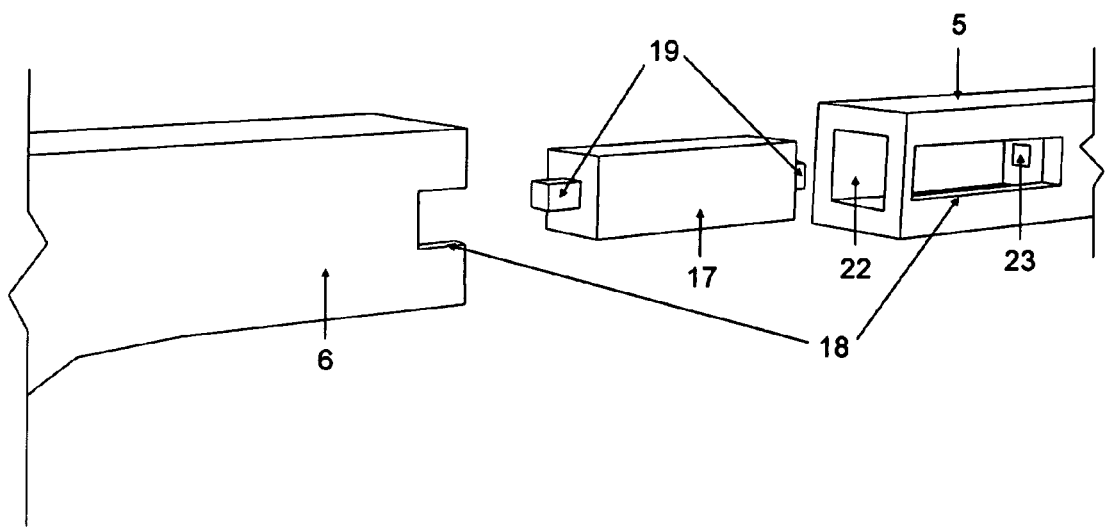
FIG. 6 provides another perspective view of an embodiment 2 whereby the components of the temple assembly are shown. This view clearly shows the cartridge sub-compartment in the temple.

In regards to our invention, another embodiment 2 is depicted in FIGS. 4, 5, and 6. FIG. 4 presents a perspective view of a pair of eyeglasses with two attached temple assemblies (embodiment 2) and all parts installed and secured. Unlike embodiment 1 (shown in FIG. 1), embodiment 2 has no external lids covering hidden compartments within temples 5. Instead, embodiment 2 has cartridge(s) 17 concealed securely in compartment(s) made up of sub-compartments within temples 5 and temple tips 6, as will be described below. FIG. 4 also illustrates how one of our temple assemblies appears when looking straight onto an exterior lateral surface 8 of temple 5. When a person wears eyewear that incorporates embodiment 2 of our temple assembly invention, a wearer can regulate the thermal condition of his head without sacrificing style or comfort.

In FIG. 4, a pair of eyeglasses incorporating embodiment 2 of our temple assembly invention is comprised of frame 1, two lenses 2, two temples 5, and two temple tips 6. Frame 1 can be attached to the temples in any of the standard current means of making an eyewear assembly, which is depicted here as temple hinge screws 10. Each temple assembly is comprised of a temple 5, a detachable temple tip 6, a cartridge compartment, an installable cartridge 17, and a mechanism to secure the cartridge within the cartridge compartment. Different from embodiment 1, the cartridge compartment of a temple assembly (embodiment 2) is comprised of two sub-compartments, one from temple 5 and the other from temple tip 6 as shown in FIGS. 5 and 6. A single cartridge compartment is formed when temple 5 and temple tip 6 are attached and fitted together. This single compartment, which has dimensions less than the corresponding dimensions of the temple assembly but can be larger than those of a single cartridge, can accommodate a single or multiple cartridge(s).

As for the installable cartridge 17, it can perform various functionalities and can be of any size & shape as long as a user can securely place the cartridge within a single cartridge compartment. For embodiment 2, the installable cartridge is a thermal regulating module. Lateral opening(s) 18 on interior lateral surface 9 of a temple assembly (see FIG. 4) allow the cartridge to interact with, such as cooling or warming, a wearer's head or environment. In addition, similar to embodiment 1, a means to modulate the rate or amount of interaction, such as thermal regulation, between the cartridge and the wearer or environment could be through a system of detachable cover(s) that fit into or over the interior lateral surface opening(s). The regulating cover(s) can have variable sized holes or be made of different insulating materials. However, the presented means to allow a cartridge to interact with its surroundings and to modulate the rate or amount of interaction can be embodied in many other different forms and should not be construed as being limited to this embodiment.

In FIGS. 5 and 6, embodiment 2's particular mechanism of securing and concealing cartridge 17 in its compartment is described in detail. As shown in FIG. 5, temple tip 6 can be detached from temple 5 by sliding it away from temple 5. Temple tip 6 can be also attached to temple 5 through the sliding and fitting of temple tip 6 over temple 5, with temple tip 6 overlapping and covering a part of temple 5 (as shown in FIG. 4). Once temple tip 6 is detached, thus exposing sub-compartment 20 in the temple tip (shown in FIG. 5) and sub-compartment 22 in the temple (shown in FIG. 6), one can either place the cartridge 17 into temple tip 6 or temple 5 first.

Cartridge 17 is comprised of small tabs 19 that provide a secure fit within temple 5 and temple tip 6. Temple tip 6 will accommodate cartridge 17 through the proper fitting of the cartridge within temple tip cartridge sub-compartment 20. Temple tip cartridge sub-compartment 20 incorporates a small tab slot 21 that matches up with its counterpart tab 19 on cartridge 17. Similarly, temple 5 incorporates a small tab slot and cartridge sub-compartment (not shown in FIG. 5 but displayed in FIG. 6) that will be described later.

Lastly, FIG. 6 displays a different perspective view of an embodiment 2 of our invention. FIG. 6 clearly illustrates a small tab slot 23 within temple cartridge sub-compartment 22. This small tab slot 23 will allow cartridge 17 to be properly fitted and secured into temple sub-compartment 22. The combination of temple tip sub-compartment 20 & temple cartridge sub-compartment 22, as well as cartridge tabs 19 and tab slots 21 & 23, will ensure a secure fit for cartridge 17 within temple tip 6 and temple 5. FIG. 6 also shows temple 5's and temple tip 6's interior lateral surface opening(s) 18 that will allow the thermal regulating cartridge to interact with a wearer.

As shown in FIGS. 5 and 6, the mechanism of securing and concealing cartridge 17 in a compartment, which is comprised of sub-compartments 20 and 22, is described as a system of cartridge tabs 19 on thermal regulating cartridge 17 and matching tab slots 21 and 23 in sub-compartments 20 and 22. Of note, the presented mechanism(s) of securing and concealing thermal regulating cartridge 17 within a single cartridge compartment, which is made up of two sub-compartments, can be expressed in many other different forms and should not be construed as being limited to this embodiment 2. It will be understood by those skilled in the art that embodiment 2 of the presented invention can be readily manufactured, changed, modified, and/or adapted in numerous ways to accommodate an unlimited range of uses.

With respect to the above description, it is to be realized that the optimum relationships for the components of our invention are to include variations in materials, shape, form, function & manner of operation, and assembly & use. The relationships between the parts of our invention are deemed readily apparent and obvious to one skilled in the art. All equivalent relationships to those illustrated in the drawings and described in the specification are intended to be encompassed by the present invention. Therefore, the foregoing is considered as illustrative only of the principles of our invention. Further, since numerous modifications and changes will readily occur to those skilled in the art, it is not desired to limit our invention to the exact construction and operation shown and described; accordingly, all suitable modifications and equivalents that may be resorted to will fall within the scope of our invention.

We claim:

1. An eyewear assembly comprising of:
    a.) a pair of eyeglasses made up of a frame, lenses, bridge, and nose-pads
    b.) a temple assembly comprised of:
        (1) a temple comprised of at least one sub-compartment, said sub-compartment having at least one tab slot for at least partially housing at least one removable modular cartridge;
        (2) a detachable temple tip comprised of at least one sub-compartment, said sub-compartment having at least one tab slot for at least partially housing at least one removable modular cartridge;
        (3) at least one removable modular cartridge for thermal regulation; and
        (4) a concealable cartridge compartment, which is formed through the combination of said temple sub-compartment and said temple tip sub-compartment, that can fully house at least one cartridge.

2. The eyewear assembly of claim 1, wherein said concealable cartridge compartment conceals said at least one removable modular cartridge.

3. The eyewear assembly of claim 1, wherein said at least one removable modular cartridge is secured in said concealable cartridge compartment and whereby said cartridge has at least one tab that fits into said at least one tab slot located in said cartridge compartment.

4. The eyewear assembly of claim 1 further comprising at least one detachable thermal regulating cover, which has variable sized openings for interacting the user's head and the surrounding environment.

* * * * *